United States Patent
Ohmi

(10) Patent No.: US 7,512,052 B2
(45) Date of Patent: Mar. 31, 2009

(54) FORMATTING OF PHASE-CHANGE OPTICAL DISC FOR IMPROVED SIGNAL CHARACTERISTICS

(75) Inventor: Fumiya Ohmi, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 448 days.

(21) Appl. No.: 10/098,809

(22) Filed: Mar. 14, 2002

(65) Prior Publication Data

US 2002/0172123 A1    Nov. 21, 2002

(30) Foreign Application Priority Data

| Mar. 16, 2001 | (JP) | ............................. 2001-075463 |
| Mar. 22, 2001 | (JP) | ............................. 2001-083012 |
| Mar. 23, 2001 | (JP) | ............................. 2001-083969 |
| Mar. 30, 2001 | (JP) | ............................. 2001-102473 |

(51) Int. Cl.
*G11B 7/24*    (2006.01)
*G11B 5/76*    (2006.01)

(52) U.S. Cl. .................................. 369/59.25; 369/275.3

(58) Field of Classification Search .............. 369/59.25, 369/53.26, 275.3, 59.26, 53.31, 53.11; G11B 11/03, G11B 7/00, 7/006, 7/24, 5/76; H04N 5/76, H04N 7/24

See application file for complete search history.

(56) References Cited

U.S. PATENT DOCUMENTS

| 5,479,382 | A  * | 12/1995 | Nishida et al. ............ 369/13.35 |
| 5,646,930 | A  * | 7/1997 | Furumiya ..................... 369/116 |
| 5,974,025 | A | 10/1999 | Yamada et al. |
| 6,141,772 | A  * | 10/2000 | Hashimoto .................... 714/16 |
| 6,292,448 | B1 * | 9/2001 | Yoshida et al. ............ 369/53.27 |
| 6,392,970 | B1 * | 5/2002 | Fuji et al. .................. 369/47.5 |
| 6,404,713 | B1 * | 6/2002 | Ueki ......................... 369/47.53 |
| 6,411,577 | B1 * | 6/2002 | Hirose ....................... 369/53.22 |
| 6,456,576 | B1 * | 9/2002 | Kuribayashi et al. ...... 369/47.53 |
| 6,473,380 | B1 * | 10/2002 | Takahashi ................ 369/59.25 |

(Continued)

FOREIGN PATENT DOCUMENTS

EP    1143427 A2    10/2001

(Continued)

OTHER PUBLICATIONS

MAT (machine assisted translation) of JP 2000-11476.*

(Continued)

*Primary Examiner*—Peter Vincent Agustin
(74) *Attorney, Agent, or Firm*—Cooper & Dunham, LLP.

(57) ABSTRACT

A phase-change optical disc formatting device which formats a phase-change optical disc so that signal characteristics of an area in which at least one of a file structure and application data is to be recorded are substantially equal to signal characteristics of a format area. A phase-change optical disc formatting method including: formatting a phase-change optical disc so that signal characteristics of an area in which at least one of a file structure and application data is to be recorded are substantially equal to signal characteristics of a format area. A phase-change optical disc formatted such that signal characteristics of an area of the phase-change optical disc in which at least one of a file structure and application data is to be recorded are substantially equal to signal characteristics of a format area of the phase-change optical disc.

11 Claims, 10 Drawing Sheets

U.S. PATENT DOCUMENTS

| | | | |
|---|---|---|---|
| 6,496,462 B2 * | 12/2002 | Kuribayashi et al. | 369/59.11 |
| 6,611,481 B1 * | 8/2003 | Koishi et al. | 369/47.53 |
| 6,628,583 B1 * | 9/2003 | Van Den Enden et al. | 369/47.1 |
| 6,728,683 B1 * | 4/2004 | Yasuda et al. | 704/500 |
| 6,781,937 B2 * | 8/2004 | Nakajo | 369/59.12 |
| 6,999,392 B2 * | 2/2006 | Kato et al. | 369/59.11 |
| 2001/0043539 A1 | 11/2001 | Kuribayashi | |

FOREIGN PATENT DOCUMENTS

| | | | |
|---|---|---|---|
| JP | 9-16961 | | 1/1997 |
| JP | 2000-11380 | | 1/2000 |
| JP | 2000-11476 | * | 1/2000 |

OTHER PUBLICATIONS

MAT (Machine assisted translation) of JP 2000-011380—No Date—all pages.*

U.S. Appl. No. 09/199,472, filed Nov. 25, 1998.

U.S. Appl. No. 09/471,345, filed Dec. 23, 1999.

U.S. Appl. No. 09/589,792, filed Jun. 8, 2000.

* cited by examiner

| NUMBER OF OVERWRITING OPERATIONS | ×4-RECORDING | ×2-RECORDING |
|---|---|---|
| 0 | 23 | 22 |
| 1 | 28 | 23 |
| 2 | 27 | 22 |
| 3 | 25 | 23 |
| 5 | 23 | 23 |
| 10 | 22 | 22 |

FORMATTING OF PHASE-CHANGE OPTICAL DISC FOR IMPROVED SIGNAL CHARACTERISTICS

BACKGROUND OF THE INVENTION

1. Field of the Invention

The present invention relates to a data recording method for recording information on a phase-change rewritable optical disc, and more particularly, to a data recording method for allowing mass production of optical discs which are subjected to high-quality formatting processing. The invention also pertains to a device and method for formatting phase-change optical discs, and a phase-change optical disc formatted by this method. The invention also relates to a method and a device for recording rewritable recording media, and to optical recording media on which data is recorded by this method. The invention also pertains to a write protection method for optical discs.

2. Discussion of the Related Art

For formatting a magneto-optical (MO) disk, an MO disk drive for recording and playing back information to and from the MO disk detects defective sectors on the disk, registers them on a primary defect list (PDL), and records the PDL on the disk. Accordingly, when a subsequent recording or playback operation is performed, the MO disk drive re-allocates the defective sectors. By virtue of the defective-sector re-allocating function provided for the MO disk drive by the use of the PDL, formatted MO disks can be mass-produced.

In contrast, an optical disc drive, such as a compact disc rewritable (CD-RW) drive, for recording and playing back phase-change optical discs, such as CD-RW discs, cannot detect defective sectors or perform re-allocating processing on the defective sectors.

Thus, an application program (hereinafter simply referred to as an "application") for controlling the operation of an optical disc drive detects errors, for example, recovered errors, read errors, and write errors, and perform re-allocating processing.

Such an application is usually executed by using a predetermined computer system provided outside the optical disc drive, and thus, the processing time is increased over that required for executing the MO-disk formatting processing.

Additionally, execution start conditions and determination conditions to determine whether the re-allocate processing is to be performed and specific processing contents are dependent on the application. It is thus difficult to mass-produce optical discs which are subjected to formatting processing compatible with a plurality of types of applications.

Formatted discs are recorded or played back in drives produced by different manufacturers. It is thus necessary to ensure the signal quality in an area which is unambiguously used for a playback operation, for example, in an area in which file structures or application data are recorded. However, the overwriting characteristics of optical discs using a phase change material, such as CD-RW discs, are different according to the linear recording speed. Concerning multi-speed CD-RW discs in which x1-, x2-, or x4-recording is possible, if x4-overwriting is performed after initially performing x4-recording, jitter is increased in the recording signal in the above-described area. If x2-overwriting is performed after initially performing x2- or x4-recording, an increase in jitter is almost negligible. When formatting CD-RW discs by using an application (packet writing software, such as DirectCD, PacketCD, or abCD), the overwriting of the file structure or the application data is performed after the recording layer of the disc is completely formatted (initial recording). The discs formatted as described above are not suitable for mass production, and also, jitter becomes larger in the area in which the file structure or the data application is recorded than in the format area, resulting in a lower-quality recorded signal. Thus, such discs cannot be played back by another drive.

As an optical-recording-media recording method, a packet writing method is known in which a track is divided into precise fixed-length units, which are referred to as "packets", and recording, erasing, and random access can be performed on data in units of packets.

As phase-change optical recording media, CD-RWs in which data can be overwritten about 1000 times by using such a packet writing method are particularly known.

It is necessary that the phase-change optical recording media using the packet writing method be formatted before being used. After being formatted, each fixed-length packet consists of 32 blocks, each block having 2048 bytes. Each packet sequentially includes from one end of the block: one link block, which partitions the packet from the adjacent packet; four run-in blocks indicating the head of user data; user-data description blocks in which user data is recorded; and two run-out blocks indicating the end of the data. In the optical recording medium, in addition to the above-described physical format, disc-volume control information, recordable final address, route directory information, and so on, are recorded.

Link block data "0" is recorded in the link block. The link block data "0" is generated by a drive controller of an optical recording device, and is added to user data temporarily stored in a buffer, thereby forming a fixed-length packet. The fixed-length packet is then recorded in the optical recording medium (optical disc).

In the packet writing method, user data stored in the user-data description block is overwritten in units of packets, and the link block data is also written simultaneously with the overwriting of the user data.

In this case, when writing new user data into the optical recording medium in which old user data is stored, as indicated by (a) of FIG. 10, the link block data "0" used for writing the old user data is written into the link block, as indicated by (b) and (c) of FIG. 10.

However, when the same link block data "0" is always written into the same physical position before and after writing the user data, physical noise is accumulated in the link block of the recording medium, thereby increasing the jitter.

Particularly in a recording medium, such as in a database, in which user data is frequency overwritten, the same link block data is written into the same link block every time user data is overwritten, thereby increasing the jitter. As a result, the optical recording medium cannot be overwritten any longer before maximum overwriting operations are performed.

Generally, in a disc housed in a cartridge, such as a floppy disk or an MO disk, it is possible to determine when the disk is loaded on a drive whether the disk is write-protected by a write protection mechanism disposed on the cartridge, thereby protecting files from being inadvertently erased or overwritten.

In contrast, a disc which is not housed in a cartridge, such as a CD-RW disc, mechanical write protection means are not provided, and thus, it is difficult to protect data from being erased or overwritten in a CD-RW disc.

In CD-RW discs, packet writing software, such as DirectCD (manufactured by Adaptec) using the universal disc format (UDF), PacketCD (manufactured by Cequadrat), B'sClip (manufactured by BHA), is known. In this software, fixed packet writing is used for CD-PW discs. By using fixed packet writing, data can be randomly overwritten or erased by being recorded or erased in units of packets. Accordingly, data can be easily recorded on CD-RW discs, as in floppy disks or MO disks.

However, as discussed above, since a write protection function is not provided for current CD-RW discs or packet writings software, a user may erroneously overwrite, erase, or format CD-RW discs. As a result, important data may be lost.

SUMMARY OF THE INVENTION

Accordingly, in view of the above-described background, it is an object of the present invention to provide a data recording method for allowing mass production of optical discs which are subjected to high quality formatting processing.

It is another object of the present invention to provide a phase-change optical disc formatting method for allowing efficient mass production of formatted high-quality phase-change optical discs, and also to provide phase-change optical discs formatted by this method.

It is still another object of the present invention to provide a recording method and device in which optical recording media can be prevented from being deteriorated by the overwriting of user data, and to provide optical recording media in which data is recorded by the above-described recording method.

It is a further object of the present invention to provide an optical disc and an optical-disc write protection method in which data can be protected from being lost by a user.

In order to achieve the above-described objects, according to one aspect of the present invention, there is provided a phase-change optical disc formatting device which formats a phase-change optical disc so that signal characteristics of an area in which a file structure or application data is to be recorded are substantially equal to signal characteristics of a format area.

According to another aspect of the present invention, there is provided a phase-change optical disc formatting method including the step of formatting a phase-change optical disc so that signal characteristics of an area in which a file structure or application data is to be recorded are substantially equal to signal characteristics of a format area.

According to still another aspect of the present invention, there is provided a phase-change optical disc formatted according to the aforementioned phase-change optical disc formatting method.

According to the above-described formatting device and method, in a phase-change optical disc, such as a CD-RW disc, including a file structure or application data, signal characteristics of an area in which the file structure or application data is to be recorded are equal to or higher than those of a format area. With this arrangement, such optical discs can be mass-produced, and be used in another disc drive.

According to a further aspect of the present invention, there is provided a data recording method including the step of recording data in an optical disc including a format area and a user data area, wherein the recorded signals in the user data area have jitter not greater than jitter of recorded signals in the format area.

According to a yet further aspect of the present invention, there is provided a data recording method including the steps of recording data in a format area of a phase-change rewritable optical disc by irradiating the optical disc with a first light beam at a linear recording speed which is maximum for the optical disc to initialize the optical disc; and recording data in a user area of the optical disc by irradiating the optical disc with a second light beam at a linear recording speed slower than the maximum linear recording speed so that the recorded signals in the user area have jitter not greater than jitter of the recorded signals in the format area.

In the aforementioned data recording method, the intensity of a light beam to be applied for recording the data in the phase-change rewritable optical disc may be adjusted so that the amplitude of the recorded signals in the user data area is smaller than the amplitude of the recorded signal in the format area.

More specifically, the intensity of the light beam may be adjusted so that the amplitude ratio of the amplitude of the recorded signals in the user data area to the amplitude of the recorded signals in the format area is from 0.55 to 0.65.

According to a further aspect of the present invention, there is provided an optical disc on which data is recorded according to the above-described data recording method.

According to the above-described data recording method, signal characteristics of the user data area are higher than those of the format area, thereby improving the reliability of playback signals.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DESCRIPTION OF THE PREFERRED EMBODIMENTS

The present invention is described in detail below with reference to the accompanying drawings through illustration of preferred embodiments.

Figure 1:
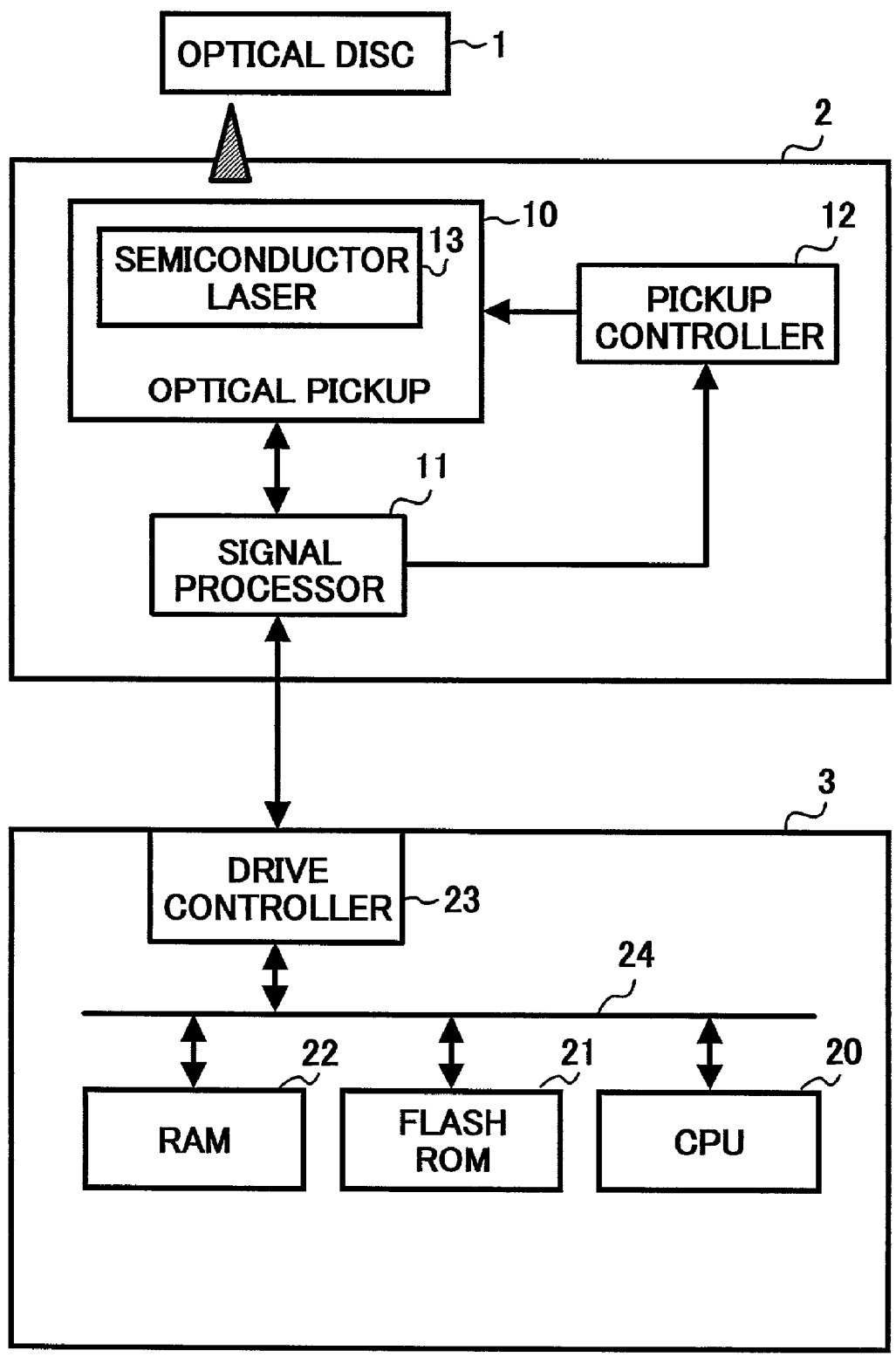
FIG. 1 is a block diagram illustrating the configuration of an optical disc device according to a first embodiment of the present invention.

FIG. 1 illustrates an optical disc device using a data recording method of a first embodiment of the present invention. The optical disc device shown in FIG. 1 is used for recording and playing back information to and from an optical disc 1, and includes an optical disc drive 2 and a control unit 3.

The optical disc 1 is a rewritable recording carrier, such as a CD-RW disc, utilizing a change in optical characteristics (transmittance or reflectance) caused by a phase change. By applying a light beam to the optical disc 1, information can be recorded or played back. More specifically, a light beam is applied to a track of the recording layer of the optical disc 1 in a highly crystalline state so as to increase the temperature to the melting point of the recording layer material or higher. Accordingly, a transition occurs in the track from the highly crystalline state to an amorphous state having lower crystallinity, thereby forming pits in which information can be recorded.

Information is recorded or played back in units of sectors forming a track having a predetermined length. Each sector is provided with a format area in which address data is recorded and a user data area in which user data, such as a file structure and application data, is recorded.

The optical disc drive 2 records and plays back information to and from the optical disc 1 by loading the optical disc 1 therein and by controlling the rotation of the optical disc 1. The optical disc drive 2 includes an optical pickup 10, a signal processor 11, and a pickup controller 12.

The optical pickup 10 records and plays back information to and from the optical disc 1 by applying a light beam to the recording layer of the optical disc 1. The optical pickup 10 is provided with, for example, a semiconductor laser 13 for emitting a light beam.

The signal processor 11 is formed of, for example, an analog signal processor (ASP) or a digital signal processor (DSP), and supplies a recording signal for recording information in the optical disc 1 to the optical pickup 10 under the control of the control unit 3. The signal processor 11 also adjusts the signal detected by the optical pickup 10 and generates a playback signal, a tracking error signal, a focus error signal, etc. The playback signal generated by the signal processor 11 is supplied to the control unit 3.

The pickup controller 12 drives the optical pickup 10 to perform tracking control and focus control. More specifically, the pickup controller 12 moves the optical pickup 10 in the radial direction of the optical disc 1 according to the tracking error signal generated by the signal processor 11, thereby performing tracking control for adjusting the position to which the light beam is applied. The pickup controller 12 also adjusts the focus position of the light beam emitted from the optical pickup 10 according to the focus error signal generated by the signal processor 11, thereby performing focus control.

The control unit 3 controls the recording operation and the playback operation performed by the optical disc drive 2 on the optical disc 1. The control unit 3 includes a central processing unit (CPU) 20, a flash read only memory (ROM) 21, a random access memory (RAM) 23, and a drive controller 23, which are connected to each other via a bus 24.

The CPU 20 is a microprocessor which reads an operating program stored in the flash ROM 21 and executes various types of processing.

The flash ROM 21 is a non-volatile memory, such as an electronically erasable and programmable ROM (EEPROM), and stores information unique to applications, for example, universal disc format (UDF) data and the file structure, therein. The operating program and various types of data required for executing processing by the CPU 20 are also stored in the flash ROM 21.

The RAM 22 is a volatile semiconductor memory, which provides a work space for the execution of various types of processing by the CPU 20.

The drive controller 23 is an interface, such as an AT attachment packet interface (ATAPI) or a small computer system interface (SCSI), for transmitting and receiving data to and from the optical disc drive 2. More specifically, the drive controller 23 transmits data transferred from the flash ROM 21 under the control of the CPU 20 to the optical disc drive 2 as the recording signal. The drive controller 23 also sends a playback signal received from the signal processor 11 provided for the optical disc drive 2 to the CPU 20 as the playback data.

The drive controller 23 provides operating instructions to the optical disc drive 2 by sending various command signals to the optical disc drive 2. For example, the drive controller 23 sends a command signal for adjusting the linear recording speed used for recording information in the optical disc 1 by the optical disc drive 2 and a command signal for adjusting the intensity of a light beam emitted from the semiconductor laser 13.

The operation of the above-configured optical disc device is as follows.

After performing formatting processing for initializing the overall recording layer of the optical disc 1 which is manufactured according to a process, such as multi-layered film deposition, the optical disc device records data, such as a file structure and application data.

Immediately after being manufactured, the optical disc 1 is in the amorphous state exhibiting low crystallinity on the recording layer. This state is referred to as the "amorphous state after deposition" (as-deposited state), and the optical characteristics of the amorphous state after deposition are different from those of the amorphous state when information is recorded.

The optical pickup drive 2 applies a light beam emitted from the semiconductor laser 13 to the overall optical disc 1 so as to heat the optical disc 1 to a crystalline temperature lower than the melting point of the recording layer, thereby temporarily initializing the recording layer to a highly crystalline state. In this case, the control unit 3 controls the optical pickup drive 2 to perform formatting processing for recording address data on each sector of the format area of the optical disc 1.

Thereafter, data is to be recorded on the initialized optical disc 1. In this case, the intensity of the light beam emitted from the optical pickup 10 is adjusted, and then, the light beam is applied to heat the optical disc 1 to the melting point of the recording layer or higher and to quench it, thereby forming amorphous-state pits whose crystallinity is decreased.

Conversely, by applying a light beam to the pits formed in the optical disc 1 by the optical pickup 10, the optical disc drive 2 heats the pits to a crystalline temperature lower than the melting point of the recording layer so that the pits in the amorphous state are returned to the crystalline state, thereby erasing the recorded data.

The optical disc drive 2 is able to adjust the linear speed for recording or playing back information to or from the optical disc 1 to, for example, a predetermined standard velocity (x1), x2, or x4 according to an instruction from the control unit 3.

It is known that the overwriting characteristics are changed according to a change in the linear recording speed when the optical disc drive 2 overwrites information in the optical disc 1.

More specifically, when user data is overwritten at x4 after initially recording data, such as address data, in the optical disc 1 at, for example, x4, the jitter in the recording signal is increased compared to that occurring during initial recording. In contrast, when data is overwritten at x2 after recording data in the optical disc 1 at the standard speed (x1), x2, or x4, the increase in jitter in the recording signal is not as much as that when initial recording is performed at x4 and overwriting is also performed at x4.

The optical disc drive 2 also changes the signal amplitude of the light beam emitted from the optical pickup 10 in accordance with an instruction from the control unit 3.

As described above, when information is recorded in the optical disc 1 by adjusting the signal amplitude of the light beam, jitter in the recording signal is changed.

For example, when overwriting is performed at x4 after recording information in the optical disc 1 at x2 by using the same intensity of light beam, information cannot be completely erased from the pits formed on the recording layer of the optical disc 1 compared to the case in which x4-overwriting is performed after recording information in the optical disc 1 at x4. Accordingly, the jitter in the recording signal is increased when x4-overwriting is performed after x2-recording.

Thus, the signal amplitude used for x2-recording is set to lower than that used for x4-recording by decreasing the intensity of the light beam used for x2-recording. With this setting, the jitter occurring in the recording signal when overwriting is performed at x4 after recording information in the optical disc 1 at x2 is substantially equal to that when overwriting is performed at x4 after recording information in the optical disc 1 at x4.

In the above-described optical disc device constructed in accordance with the first embodiment, the signal characteristics in the user data area, in which the file structure and the application data are recorded, are comparable to or improved over the signal characteristics in the format area, thereby improving the reliability of playback signals.

Figure 2:
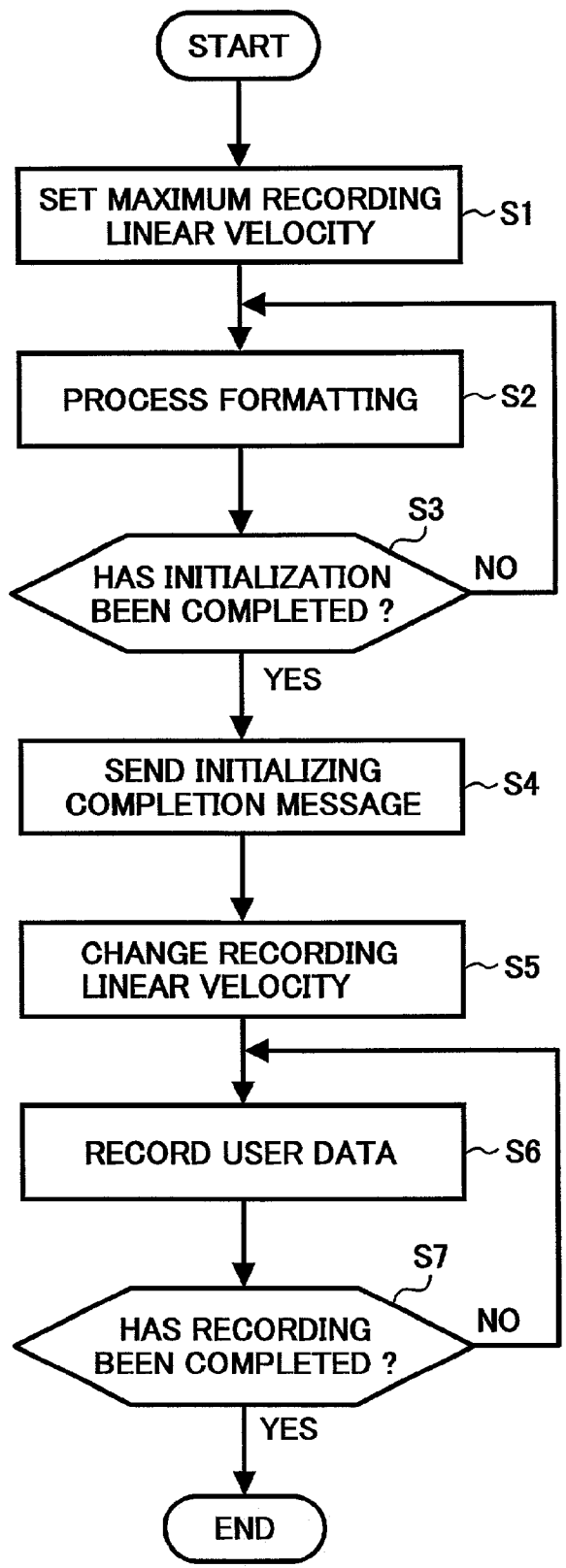
FIG. 2 is a flowchart illustrating the operation for recording data in an optical disc by the optical disc drive shown in FIG. 1.

FIG. 2 is a flowchart illustrating an example of the operation for recording data in the optical disc 1 by the optical disc device shown in FIG. 1.

The CPU 20 of the control unit 3 controls the operation of the optical disc device by sending instructions to the optical disc drive 2 via the drive controller 23 in accordance with the operating program read from the flash ROM 21. The optical disc drive 2 starts executing the operation indicated by the flowchart of FIG. 2 in accordance with the instructions received from the control unit 3.

More specifically, in step S1, the optical disc drive 2 sets the linear recording speed for performing formatting processing on the optical disc 1 in accordance with the instruction from the control unit 3. In this case, the optical disc drive 2 sets the maximum linear speed of the optical disc 1 as the linear speed for performing formatting processing. For example, when the optical disc 1 is able to record at the standard speed (x1), x2, or x4, the optical disc drive 2 sets x4 as the linear recording speed.

Then, in step S2, the optical disc drive 2 rotates the optical disc 1 loaded in the optical disc drive 2 according to the rotation speed corresponding to the linear recording speed, and applies a light beam emitted from the optical pickup 10 to the overall recording layer of the optical disc 1, thereby performing formatting processing for initializing the optical disc 1. For example, the optical disc drive 2 performs formatting processing on the optical disc 1 by using a format unit command. A determination as to whether the optical disc 1 has been correctly initialized can be made as follows. The drive controller 23 detects error information (recovered error, read error, write error, etc.) sent from the optical disc drive 2 to the control unit 3 while performing the recording/playback operation. The CPU 20 then receives an error code from the drive controller 23, and then performs the above-described determination.

The optical disc drive 2 then determines in step S3 whether the initialization of the optical disc 1 has been completed. If the result of step S3 is no, the process returns to step S2, and the above-described formatting processing is repeated.

If the optical disc drive 2 determines in step S3 that the initialization of the optical disc 1 has been completed, the process proceeds to step S4. In step S4, the optical disc drive 2 sends an initialization completion message to the control unit 3.

Upon receiving the initialization completion message from the optical disc drive 2, in step S5, the CPU 20 of the control unit 3 sends an instruction to the optical disc drive 2 via the drive controller 23 to change the linear recording speed for overwriting user data, such as the file structure or the application data, in the optical disc 1.

In this case, the control unit 3 sets the linear recording speed for overwriting the user data in the optical disc 1 lower than that for performing formatting processing so that excellent overwriting characteristics can be exhibited. For example, if the optical disc drive 2 performs formatting processing at x4, the control unit 3 sets x2 as the linear recording speed for overwriting the user data.

Thereafter, in step S6, the optical disc drive 2 drives the optical disc 1 according to the rotation speed corresponding to the linear recording speed set by the control unit 3 in step S5, and also records user data, such as the file structure or the application data, in the user data area of the optical disc 1 according to the received recording signal.

The optical disc drive 2 then determines in step S7 whether the recording (writing) of the user data has been completed. If not, the process returns to step S6, and the recording (writing) of the user data is continued.

If the optical disc drive 2 determines in step S7 that the recording (writing) of the user data has been completed, the operation for recording data in the optical disc 1 is completed.

As discussed above, the optical disc 1 is initialized at the maximum linear speed of the optical disc 1, and then, the user data, such as the file structure or the application data, is recorded at a linear speed exhibiting high overwriting characteristics. Accordingly, the jitter occurring in the recording signal in the user data area of the optical disc 1 is less than that in the format area, thereby improving the reliability of playback signals.

Figure 13:
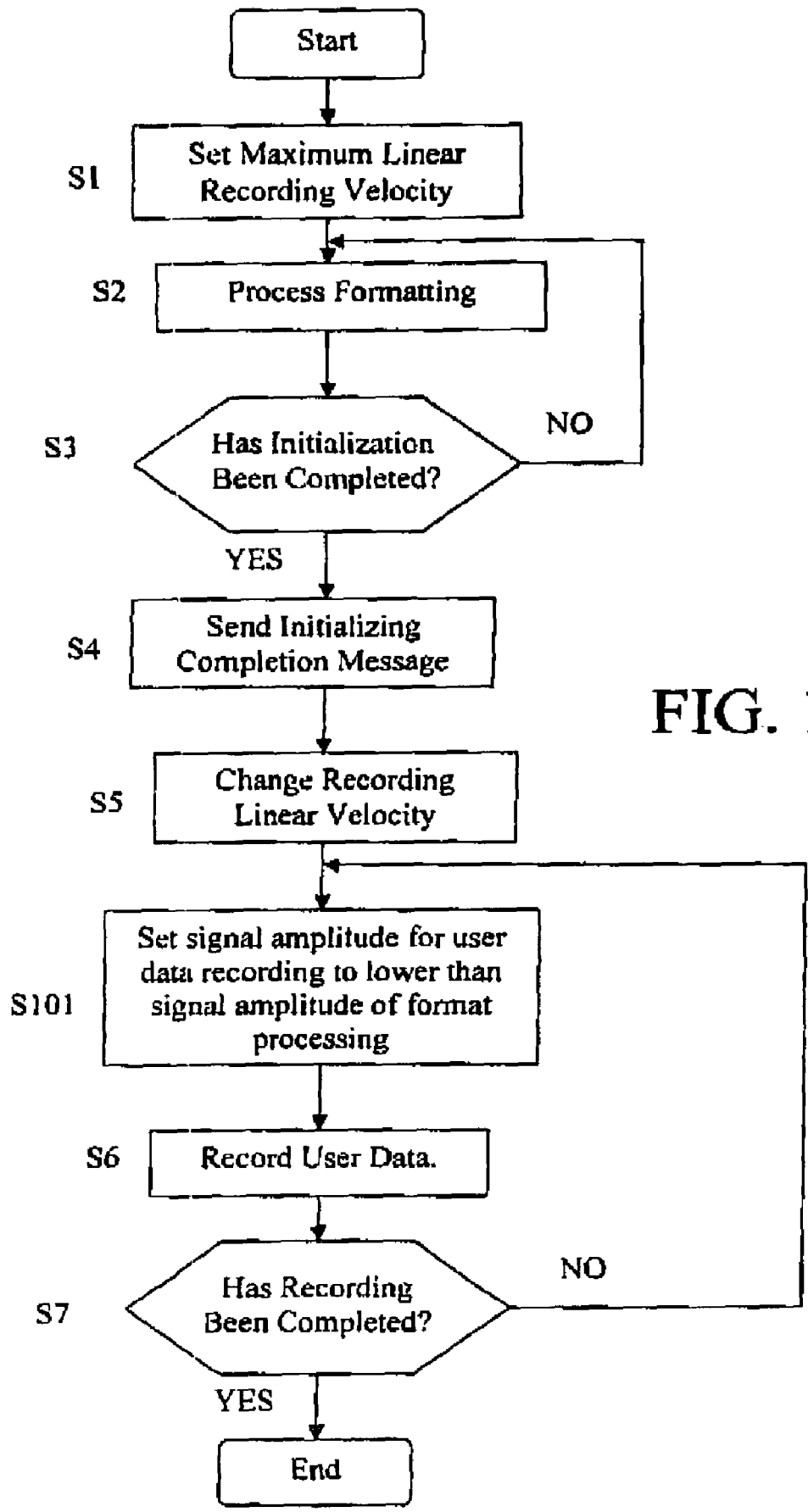
FIG. 13 is a flow chart illustrating a data recording method according to another exemplary embodiment.

When recording the user data in step S6, the intensity of a light beam emitted from the optical pickup 10 may be adjusted so as to set the signal amplitude smaller than that set for the format processing in step S2. That is, the control unit 3 sends an instruction to set a smaller signal amplitude to the optical disc drive 2 (step S101 in FIG. 13) in addition to the instruction to change the linear recording speed sent to the optical disc drive 2 from the CPU 20 via the drive controller 23 in step S5.

Figure 14:
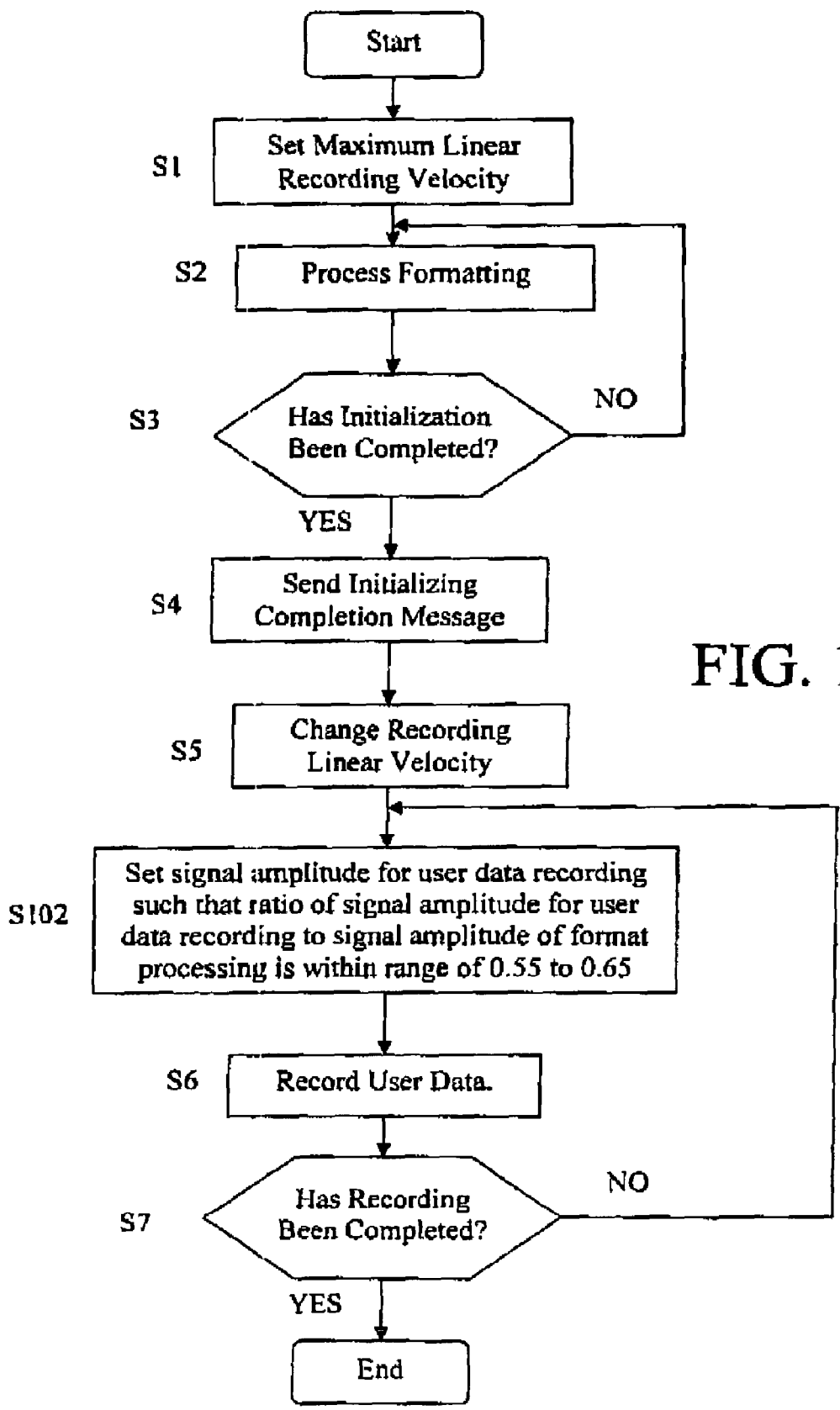
FIG. 14 is a flow chart illustrating a data recording method according to another exemplary embodiment.

For example, the ratio m11 of the signal amplitude for user data recording to that for format processing is set to $0.55 \leq m11 < 0.65$ (step S102 in FIG. 14). Then, jitter occurring in the recording signal in the user data area becomes equal to that in the format area, thereby obtaining high quality playback signals.

As discussed above, the signal amplitude for recording the user data, such as the file structure and the application data, is set to be smaller than that for recording the address data. With this arrangement, the jitter occurring in the recording signal in the format area becomes equal to that in the user data area, thereby improving the reliability of playback signals.

As is seen from the foregoing description, according to the first embodiment of the present invention, the linear speed used for initializing the optical disc 1 is set to the maximum linear speed of the optical disc 1, and the linear speed for recording the user data, such as the file structure and the application data, in the user data area is set to a linear speed exhibiting excellent overwriting characteristics. The intensity of a light beam for overwriting the data in the user data area of the optical disc 1 is less than the light intensity for initializing the optical disc 1, so that a lower signal amplitude for performing the overwriting operation can be set. With this arrangement, the reliability of playback signals of the optical disc 1 can be improved, thereby facilitating mass production of the formatted optical discs 1.

Although in the first embodiment the information can be recorded in the optical disc 1 at x1, x2, or x4, it may be recorded at a different linear speed.

It is not essential that data, such as the file structure and the application data, and the operating program be stored in the flash ROM 21. Such data may be stored in a desired recording medium, such as a magnetic disk recording device connected to the bus 24.

A phase-change optical disc formatting device constructed in accordance with a second embodiment of the present invention is discussed below with reference to FIGS. 3, 4A, and 4B.

Figure 3:
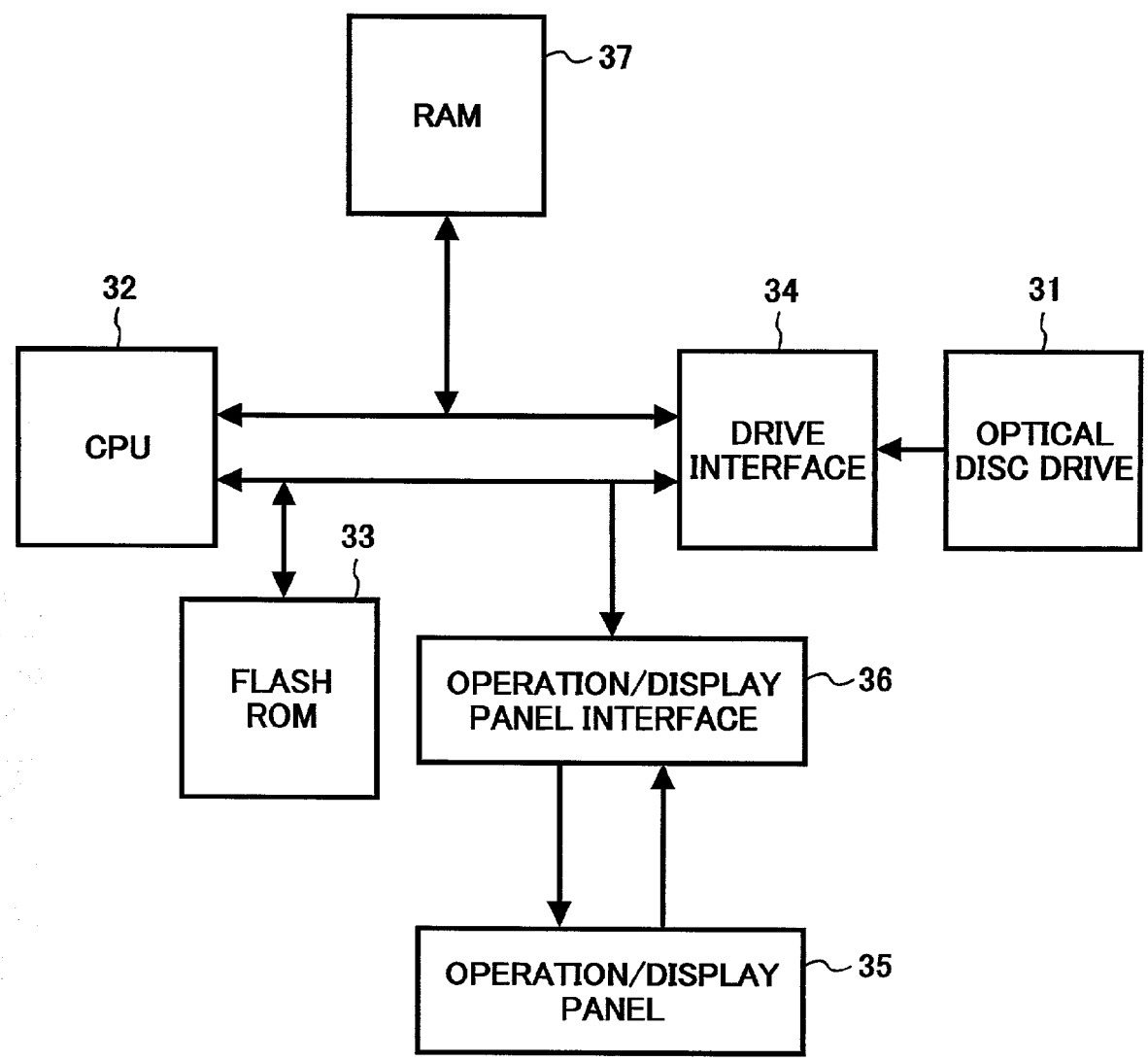
FIG. 3 is a block diagram illustrating the configuration of a phase-change optical disc formatting device according to a second embodiment of the present invention.

The phase-change optical disc formatting device shown in FIG. 3 includes an optical disc drive 31, a CPU (control means) 32 for controlling the optical disc drive 31, a flash ROM (storage means) 33 for storing information unique to applications, such as UDF data and a file structure, and also for storing a format program to be executed, a drive interface 34, such as an ATAPI or a SCSI, an operation/display panel 35, an operation/display panel interface 36, and a RAM 37 used as a work area by the CPU 32. The CPU 32, the flash ROM 33, the drive interface 34, the operation/display panel interface 36, and the RAM 37 are mounted on a drive control circuit (not shown).

UDF stands for Universal Disk Format, which is a standard defined by the Optical Storage Technology Association (OSTA), and is standardized by ISO 13346. Currently, UDF 2.0 is the latest version, and is the standard for the optical-disc logic format. In the second embodiment, processing performed by using UDF 2.0 is the first processing required for randomly recording or playing back data to or from a CD-RW according to a technique referred to as "packet writing". Currently, there are two applications, such as DirectCD (manufactured by Adaptec) and PacketCD (manufactured by CeQuadrat) which are able to perform packet writing on CD-RWs, and data and a data structure determined by the UDF during formatting are recorded in predetermined addresses.

Information, such as the UDF data and the file structure, can be transferred (copied) from one phase-change optical disc (hereinafter simply referred to as a "disc") to another disc in the following manner. The information is first played back from the disc, is stored in the flash ROM 33, and is then recorded at predetermined addresses on a new disc. A determination as to whether the disc has been correctly formatted can be made by receiving error information (recovered error, read error, and write error) by the CPU 32 sent from the optical disc drive 31 via the drive interface 34 while the recording/playback operation is performed.

Formatting Method (1)

In the above-configured formatting device, by using a write command, information, such as the file structure or the application data, is recorded, and formatting is performed at the maximum recording linear speed. The file structure or the application data is recorded on predetermined positions by transferring corresponding data from the flash ROM 33 to the optical disc drive 31, and zero data is transferred to the optical disc drive 31 and is then recorded on the format area of the disc. Accordingly, the file structure or the application data can be protected from being overwritten. Thus, jitter is not increased in the area in which the file structure or the application data is stored, and the recording signal in this area becomes comparable to that in the format area.

Formatting Method (2)

In the above-configured formatting device, the format area is formatted by using a format unit command at the maximum linear recording speed of a corresponding disc, and then, the file structure or the application data is overwritten at the linear recording speed (x2) exhibiting high overwriting characteristics. Thus, the jitter is not increased in the area in which the file structure or the application data is stored, and the recording signal in this area becomes comparable to that in the format area.

Figures 4A, 4B:
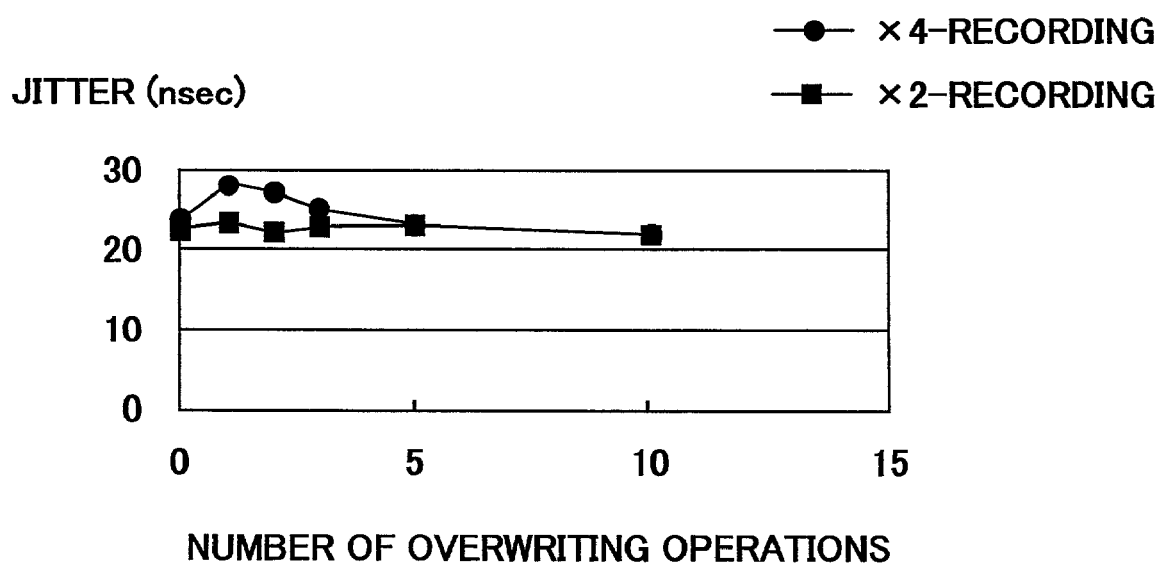
FIGS. 4A and 4B illustrate measurement results indicating the relationship between the recording velocity of x1-, x2-, and x4-CD-RW discs and resulting overwrite jitter.

FIGS. 4A and 4B illustrate measurement results indicating the relationship between the recording velocity of x1-, x2-, and x4-CD-RW discs and the jitter occurring because of the overwriting operation. The playback velocity used for the measurements is x1.

In the related art, when the file structure or the application data is overwritten at x4 after formatting the overall recording layer of the disc at x4 according to a known formatting method, the jitter is considerably increased after the overwriting operation is performed only one time, thereby failing to obtain a high-quality recording signal.

As in the above-described formatting method (1), however, when formatting is performed by using the write command at the maximum linear recording speed, the file structure or the application data can be recorded, as shown in FIGS. 4A and 4B, with the conditions comparable to those when overwriting is not performed. Thus, the jitter is not increased, and a high-quality recording signal can be obtained.

When the file structure or the application data is recorded at x2, as in the above-described formatting method (2), the jitter is not increased, as indicated in the measurement results shown in FIGS. 4A and 4B, thereby obtaining a high-quality recording signal.

A third embodiment of the present invention is described below with reference to FIGS. 5 through 10.

Figure 6:
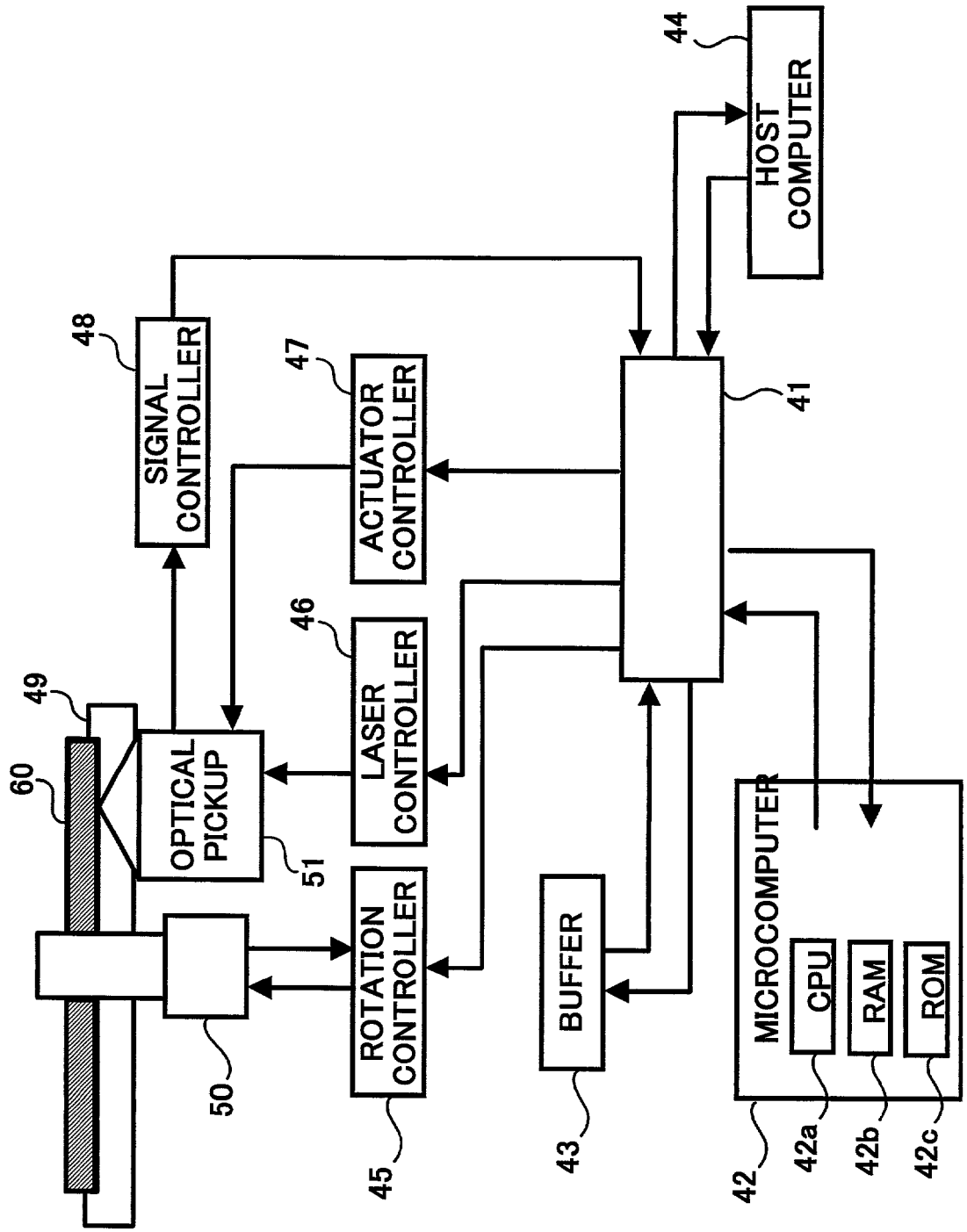
FIG. 6 is a block diagram illustrating a recording device for recording data on an optical recording medium of the present invention.

A CD-RW drive, which serves as an optical recording device of the present invention, includes a drive controller 41, as shown in FIG. 6. The drive controller 41 transmits and receives information to and from a microcomputer 42, a buffer 43, a host computer 44, a rotation controller 45, a laser controller 46, an actuator controller 47, and a signal controller 48. The drive controller 41 transmits and receives information to and from the host computer 44 via an interface (not shown).

An optical recording medium (CD-RW disc) 60 is placed on a tray 49, and the rotation controller 45 controls the operation of a spindle motor 50 to rotate the optical recording medium 60. The laser controller 46 controls a semiconductor laser of an optical pickup 51 to be turned ON or OFF. The actuator controller 47 drives the optical pickup 51 to move vertically and horizontally so that data is read and written into and from the optical recording medium 60 by laser light applied to the optical recording medium 60. Laser light reflected by the optical recording medium 60 is input into the signal controller 48 via the optical pickup 51, and a signal from the signal controller 48 is input into the drive controller 41. Upon receiving this signal, the drive controller 41 performs feedback control, and also controls the reading and writing of information.

The microcomputer 42, which serves as the core of the CD-RW drive, includes a CPU 42a, a RAM 42b and a ROM 42c, and performs the overall control of the CD-RW drive.

The buffer 43 temporarily stores user data input via the host computer 44 in units of packets, and reserves the time according to the processing rate of the CD-RW drive while the user data is computed by the CPU 42a before being output to the optical recording medium 60. Thus, the processing rate of the overall CD-RW drive can be increased.

The host computer 44 is connected to an input/output device (not shown). The host computer 44 possesses packet writing software, and inputs new user data to the drive controller 41 via an interface (not shown), and provides a packet writing software program for performing processing in the CD-RW drive.

In the optical recording medium 60, a chalcogen alloy, such as an AgInSbTe alloy or a GeInSbTe alloy, is used for the recording layer.

Since the optical recording medium 60 is a phase-change type, the following phase-change recording method is employed. Laser light having power (recording power) to increase the temperature to the melting point of the recording layer or higher is applied to the recording layer by the optical pickup 51, and then, the recording layer melts and is quenched, thereby forming amorphous recording marks (pits) in which user data is recorded. Conversely, for erasing the user data, laser light having power (erasing power) to increase the temperature to the crystalline temperature or higher and to the temperature lower than the melting point of the recording layer is applied to the amorphous recording marks by the optical pickup 51. The recording layer to which the laser light is applied is thus heated to the crystalline temperature so that the amorphous recording marks are returned to the crystalline state, thereby erasing the user data.

Figure 7:
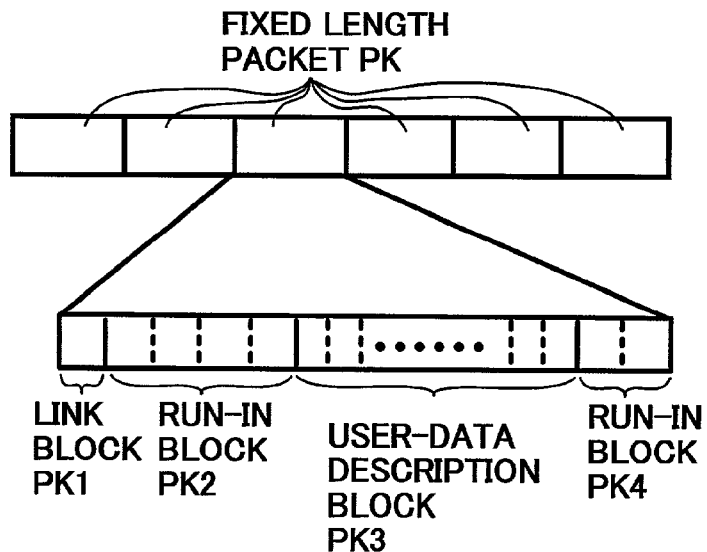
FIG. 7 illustrates the configuration of a fixed-length packet to be recorded on an optical recording medium of the present invention.

In this optical recording medium 60, the packets are formatted to the fixed length before being used. As shown in FIG. 7, each fixed-length packet PK has 32 blocks (64 Kbytes). The fixed-length packet PK sequentially includes from one end of the packet PK: one link block PK1; four run-in blocks PK2 indicating the head of the user data; user-data description blocks PK3; and two run-out blocks PK4 indicating the end of the data.

Figure 8:
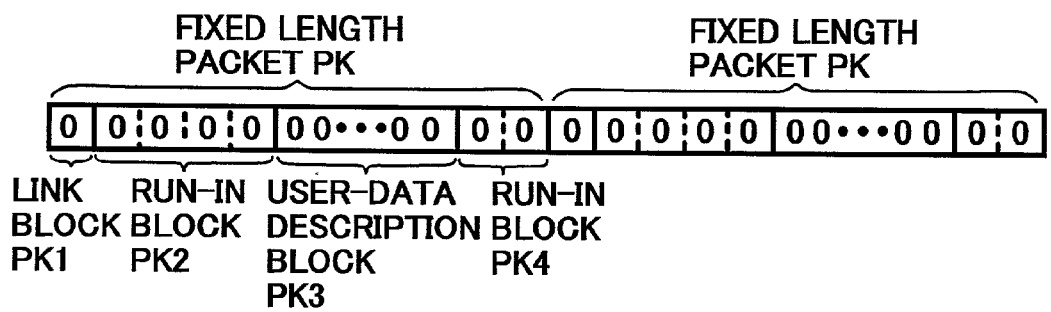
FIG. 8 illustrates the configuration of a fixed-length packet when the optical recording medium of the present invention is formatted.

In all the formatted fixed-length packets, as shown in FIG. 8, "0" is written into the link block PK1, the run-in blocks PK2, the user-data description blocks PK3, and the run-out blocks PK4.

Figure 5:
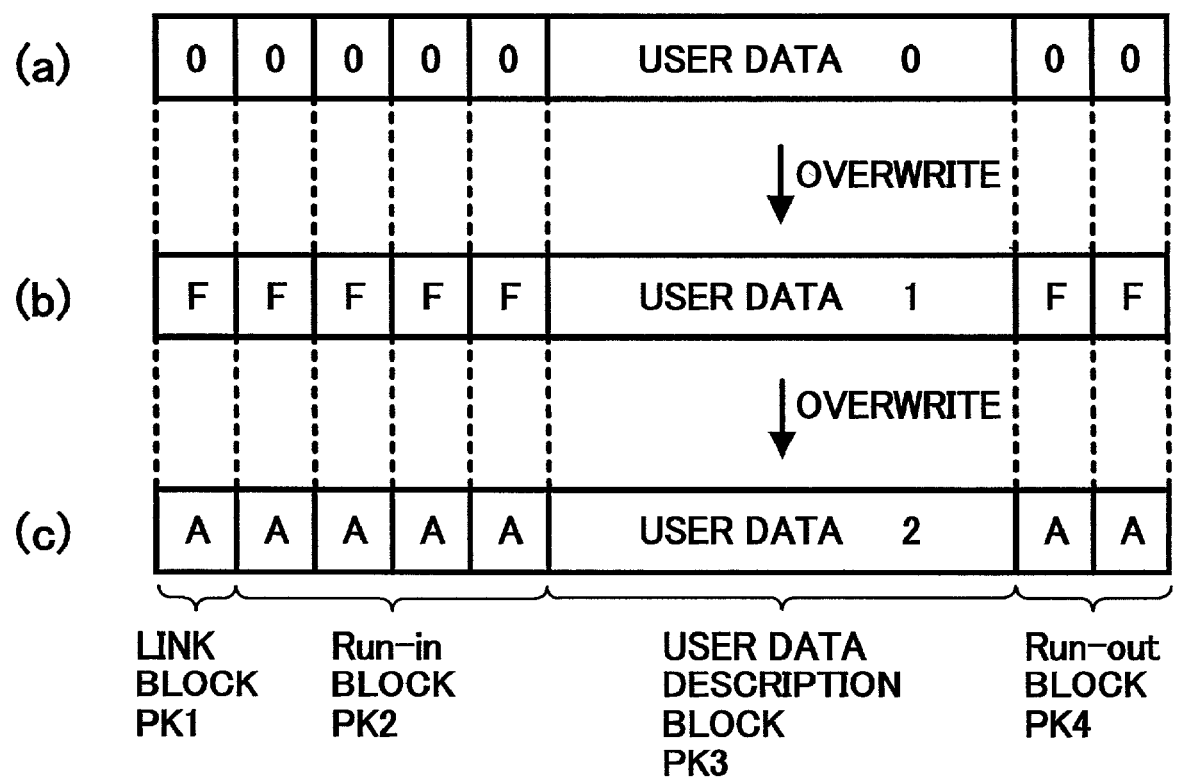
FIG. 5 is a schematic diagram illustrating a fixed-length packet when user data is overwritten by a recording method according to a third embodiment of the present invention.

When user data is written into the user-data description blocks PK3 in which data is not stored, the same data "0" as that written during formatting is written into the link block PK1, as indicated by (a) of FIG. 5. More specifically, link block data "0" is written into the link block PK1 of the optical recording medium 60 (also into the run-in blocks PK2 and the run-out blocks PK4), and user data "0" is written into the user-data description blocks PK3.

When writing data into the user-data description blocks PK3 in which old data is already recorded, the following procedure is taken in the CD-RW drive.

It is determined that user data which was previously written in the user-data description blocks PK3 is referred to as "old user data", and user data to be written is referred to as "new user data".

The new user data is input from an input device (not shown) connected to the host computer 44, and is analyzed in the CPU 42a of the microcomputer 42 via the drive controller 41. The new user data is then temporarily stored in the buffer 43 in units of packets.

Then, link block data is added to each packet of the new user data stored in the buffer 43 by the drive controller 41 so as to generate fixed-length packets PK.

The drive controller 41 records the new user data of the fixed-length packets PK in the user-data description blocks PK3 of the optical recording medium 60 in which the old user data is recorded.

The link block data added to the new user data is set "F", as indicated by (b) of FIG. 5, which is different from the link block data "0" added to the old user data, and is written into the link block PK1 corresponding to the user-description blocks PK3. Accordingly, "F" is written into the link block PK1 of the fixed-length packet PK, and "user data 1" is written into the user-data description blocks PK3 as the new user data, as indicated by (b) of FIG. 5, thereby overwriting the fixed-length packet PK of the optical recording medium 60.

To overwrite the user data in the user-data description blocks PK3 of the optical recording medium 60 one more time, link block data "A", which is different from the link block data "F" used for recording the previous user data, is written into the link block PK1, as indicated by (c) of FIG. 5, and "user data 2" is written into the user-data description blocks PK3 as the new user data, thereby overwriting the fixed-length packet PK one more time.

The link block data, which is different from that for recording the old user data, is created based on random data generated by the CPU 42a. The random data is sent to the drive controller 41, is added to the new user data temporarily stored in the buffer 43, and is then recorded in the link block PK1 of the optical recording medium 60.

Figure 9:
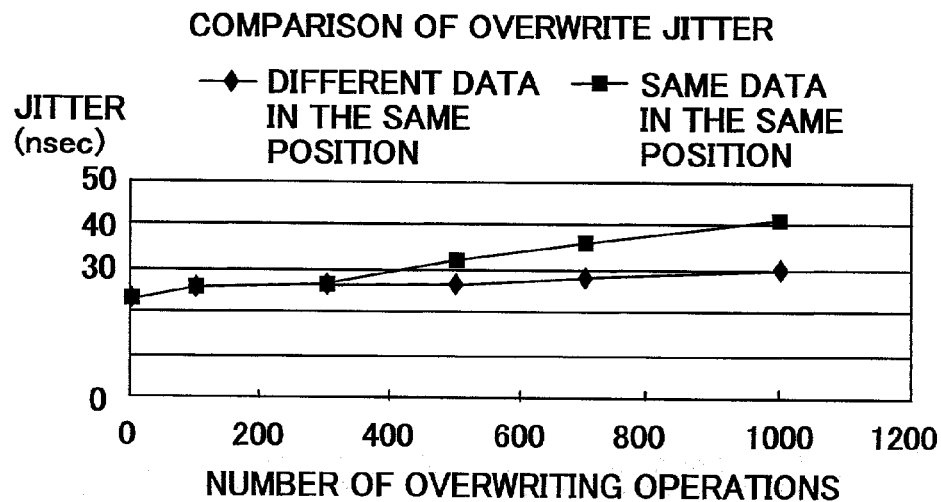
FIG. 9 illustrates comparison results between the jitter occurring by using the method of the third embodiment with the jitter occurring by using a known method.
Figure 10:
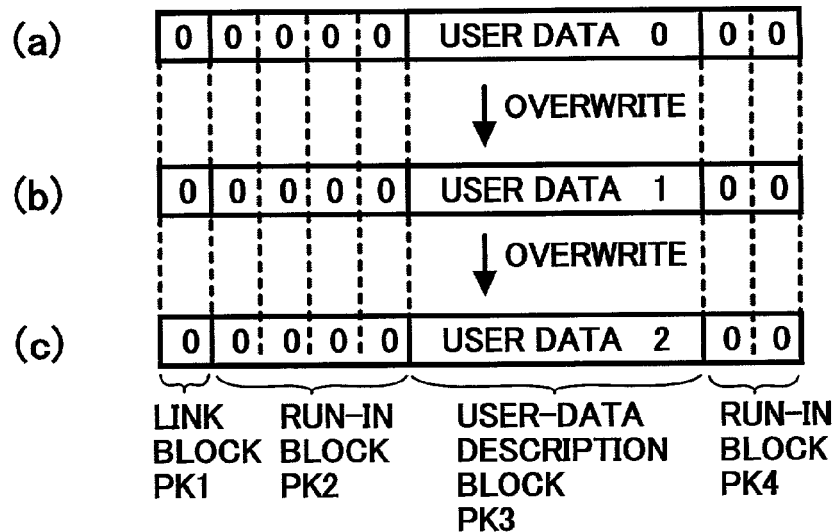
FIG. 10 illustrates a fixed-length packet when user data is overwritten according to a known method.

As described above, every time user data is overwritten, link block data different from that used for the previous user data is written into the same physical area of the optical recording medium 60. Accordingly, physical noise caused by the overwriting of data is not accumulated in the link block PK1 of the recording medium 60, and an increase in jitter in accordance with an increased number of overwriting operations can be inhibited, as shown in FIG. 9. Thus, the recording quality can be maintained in an area in which data is frequency overwritten, such as in an area in which a file structure is stored, and the optical recording medium can also be prevented from being deteriorated.

Figure 11:
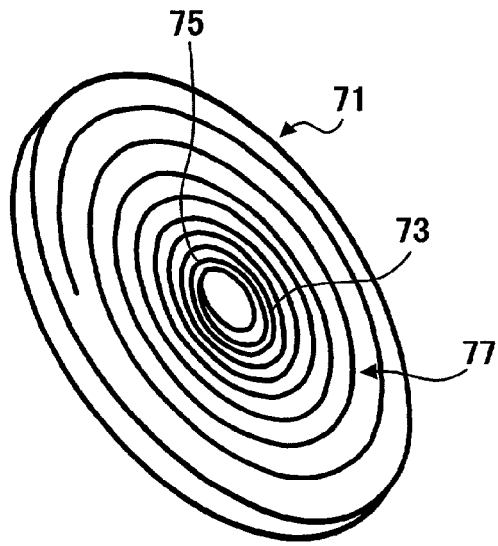
FIG. 11 schematically illustrates an optical disc according to a fourth embodiment of the present invention.
Figure 12:
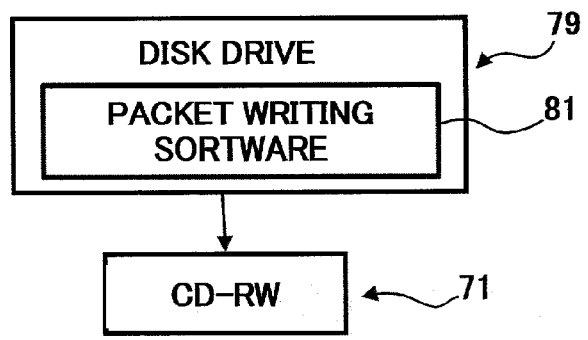
FIG. 12 is a block diagram illustrating the optical disc and a disc drive.

A fourth embodiment of the present invention is described in detail below with reference to FIGS. 11 and 12. FIG. 11 is a schematic diagram illustrating an optical disc according to the fourth embodiment of the present invention. FIG. 12 is a block diagram illustrating the optical disc shown in FIG. 11 and a disc drive.

As shown in FIGS. 11 and 12, a rewritable optical disc 71 is detachably attached to a disc drive (information recording/playback device) 79, and records digital information therein. In the fourth embodiment, a CD-RW disc which is not housed in a cartridge is used as the optical disc 71. The optical disc 71 includes a write-protection data area 73, a file recording area 75 in which a file structure is recorded, and a user-data recording area 77 in which user data is recorded. In the fourth embodiment, each of the write-protection data area 73 and the file recording area 75 uses any one sector in the optical disc 71.

In the optical disc 71, data is recorded or erased in the write-protection data area 73 and the user-data recording area 77 in units of packets according to packet writing software 81 using the UDF.

According to the UDF, an area for defining a partition, which is referred to as a "partition descriptor", is disposed on the optical recording medium 71, and the size and the position of the partition are defined. The partition descriptor also includes an area for defining the access type.

In the fourth embodiment, five access types can be defined: (1) not specified; (2) read only; (3) write once; (4) rewritable; and (5) overwritable. In order to set or cancel write protection in the optical disc 71, the packet writing software 81 changes or refers to the access type set for the write-protection data area 73.

When the user sets write protection, the access type in the optical disc 71 is changed from (4) rewritable or (5) overwritable to (3) write once. When the user attempts to perform an operation on the optical disc 71, the packet writing software 81 refers to the access type, and determines whether the optical disc 71 is write-protected. If the access type is (3) write once, data in the optical disc 71 can be protected from being changed.

When the user cancels write protection, the packet writing software 81 changes the access type from (3) write once to (4) rewritable or (5) overwritable, and then, data in the optical disc 71 can be changed.

As discussed above, write protection can be set or canceled by changing the access type using the partition descriptor. The write-protection data area 73 may be set in any area other than fixed areas, such as 16 sectors, 256 sectors, 512 sectors, which serve the predetermined functions.

According to the fourth embodiment, it is possible to prevent the user from inadvertently erasing data. Additionally, since write protection is provided in the optical disc, it is not necessary to provide physical means, such as a protect notch, thereby simplifying the configuration of the optical disc.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This document claims priority and contains subject matter related to Japanese Patent Applications Nos. 2001-075463, 2001-102473, 2001-083012 and 2001-083969, filed on Mar. 16, 2001, Mar. 30, 2001, Mar. 22, 2001 and Mar. 23, 2001, respectively, incorporated herein by reference.

Having now fully described the invention, it will be apparent to one of ordinary skill in the art that many changes and modifications can be made thereto without departing from the spirit and scope of the invention as set forth therein.

What is claimed is:

1. A data recording method comprising:
   recording data in a format area of a phase-change rewritable optical disc by irradiating the phase-change rewritable optical disc with a first light beam at a linear recording speed which is maximum for the phase-change rewritable optical disc to initialize the phase-change rewritable optical disc; and
   recording data in a user area of the phase-change rewritable optical disc by irradiating the phase-change rewritable optical disc with a second light beam at a linear recording speed slower than the maximum linear recording speed so that recorded signals in the user area have jitter not greater than jitter of recorded signals in the format area,
   wherein intensity of the second light beam irradiated for recording the data in the phase-change rewritable optical disc is adjusted so that the recorded signals in the user data area have an amplitude smaller than an amplitude of the recorded signals in the format area, and
   wherein an amplitude ratio of the amplitude of the recorded signals in the user data area to the amplitude of the recording signals in the format area is from 0.55 to 0.65.

2. A phase-change rewritable optical disc, wherein data is recorded in a format area thereof by irradiating the phase-change rewritable optical disc with a first light beam at a linear recording speed which is maximum for the phase-change rewritable optical disc, and wherein data is recorded in a user data area by irradiating the phase-change rewritable optical disc with a second light beam at a linear recording speed which is lower than the maximum linear recording speed,
   wherein intensity of the second light beam irradiated for recording the data in the phase-change rewritable optical disc is adjusted so that the recorded signals in the user data area have an amplitude smaller than an amplitude of the recorded signals in the format area, and
   wherein an amplitude ratio of the amplitude of the recorded signals in the user data area to the amplitude of the recording signals in the format area is front 0.55 to 0.65.

3. A phase-change rewritable optical disc, wherein format processing is performed in a format area thereof by irradiating the phase-change rewritable optical disc with a first light beam, and signals are recorded in a user data area by irradiating the phase-change rewritable optical disc with a second light beam,
   wherein intensity of the second light beam irradiated for recording the data in the phase-change rewritable optical disc is adjusted so that the recorded signals in the user data area have an amplitude smaller than an amplitude of the recorded signals in the format area, and
   wherein an amplitude ratio of the amplitude of the recorded signals in the user data area to the amplitude of the recording signals in the format area is from 0.55 to 0.65.

4. The phase-change rewritable optical disc of claim 3, wherein the second light beam for the format processing is irradiated on the phase-change rewritable optical disc at a maximum linear recording speed of the phase-change optical disc, and the second light beam for recording the signals in the user data area is irradiated on the phase-change rewritable optical disc at a liner recording speed that is lower than the maximum linear recording speed.

5. The phase-change rewritable optical disc of claim 3, wherein the recorded signals in the user data area have jitter not greater than jitter of recorded signals in the format area.

6. A method for recording data to one or more optical discs, said method comprising:

performing format processing to record signals in a format area of a phase-change rewritable optical disc by irradiating the phase-change rewritable optical disc with a first light beam to initialize the phase-change rewritable optical disc; and recording data in a user area of the phase-change rewritable optical disc by irradiating the phase-change rewritable optical disc with a second light beam, wherein intensity of the second light beam irradiated for recording the data in the phase-change rewritable optical disc is adjusted so that the recorded signals in the user data area have an amplitude smaller than an amplitude of the recorded signals in the format area, and wherein an amplitude ratio of the amplitude of the recorded signals in the user data area to the amplitude of the recording signals in the format area is from 0.55 to 0.65.

7. The method according to claim 6, wherein the second light beam for the format processing is irradiated on the phase-change rewritable optical disc at a maximum linear recording speed of the phase-change optical disc, and the second light beam for recording die signals in the user data area is irradiated on the phase-change rewritable optical disc at a linear recording speed that is lower than the maximum linear recording speed.

8. The method according to claim 6, wherein the recorded signals in the user data area have jitter not greater than jitter of recorded signals in the format area.

9. An apparatus for recording data to one or more phase-change optical discs, said apparatus comprising:

a disc drive configured to record information to a phase-change rewritable optical disc; and a controller configured to control said disc drive to perform format processing to the phase-change rewritable optical disc by irradiating the phase-change rewritable optical disc with a first light beam, and control said disc drive to record data in a user area of the phase-change rewritable optical disc by irradiating the phase-change rewritable optical disc with a second light beam, wherein intensity of the second light beam irradiated for recording the data in the phase-change rewritable optical disc is adjusted so that the recorded signals in the user data area have an amplitude smaller than an amplitude of the recorded signals in the format area, and wherein an amplitude ratio of the amplitude of the recorded signals in the user data area to the amplitude of the recording signals in the format area is from 0.55 to 0.65.

10. The apparatus according to claim 9, wherein said controller controls said disc drive to irradiate the first light beam for performing the format processing of the phase-change rewritable optical disc at a maximum linear recording speed of the phase-change optical disc, and controls said disc drive to irradiate the second light beam for recording the signals it the user data area at a linear recording speed that is lower than the maximum linear recording speed.

11. The apparatus according to claim 9, wherein the recorded signals in the user data area have jitter not greater than jitter of recorded signals in the format area.

* * * * *